United States Patent Office 3,244,657
Patented Apr. 5, 1966

3,244,657
PROCESS OF PREPARING A STABLE
AQUEOUS EMULSION
Frederick Grosser, Midland Park, and Marvin R. Leibowitz, Edison, N.J., assignors to General Aniline & Film Corporation, New York, N.Y., a corporation of Delaware
No Drawing. Filed Nov. 16, 1960, Ser. No. 69,571
5 Claims. (Cl. 260—29.6)

This invention relates to the production of a stable synthetic aqueous emulsion and more particularly to a stable aqueous emulsion containing a polymeric N-vinyl lactam and a process for producing such emulsion.

It is well known in the art that N-vinyl lactams can be interpolymerized with other polymerizable monomers such as acrylic and methacrylic acids and their esters, vinyl esters, and the like. Such interpolymerization has been carried out in nonaqueous systems which are not well adapted for the production of aqueous emulsions. When such interpolymerizations have been carried out in aqueous systems, either water soluble copolymers, interpolymers or mixtures of polymers have been obtained yielding aqueous solutions, or unstable emulsions have been obtained which separate upon standing and/or yield very cloudy films. These cloudy films are normally considered to indicate incompatibility or instability and show that a true interpolymer has not been introduced but more likely a mixture of homopolymers. Nor has the concurrent use of a variety of catalysts, emulsifying agents, protective colloids, buffering agents, etc, resolved the problem.

An important use for styrene and other polymers is in the form of an aqueous emulsion as employed in the paint, coatings, adhesives, polishes, and textile sizing fields. Aqueous emulsions have a great many advantages over other systems such as organic solvent systems, including the absence of fire hazards and odor and the like, low toxicity, low cost, etc. Ordinarily, emulsion polymerization is the preferred method for the preparation of such aqueous emulsions because of the economy and safety of water as the polymerization medium, the ease of temperature control, the speed of reaction, and the fact that the desired product in emulsion form is directly produced. However, as pointed out above, the use of such emulsion polymerization method or any other method for making stable aqueous emulsions having a basis of a polymeric N-vinyl lactam has hitherto been unsuccessful.

It is an object of this invention to provide a method for producing a stable aqueous emulsion containing a polymeric N-vinyl lactam. Another object of this invention is the provision of a stable aqueous emulsion containing a polymeric N-vinyl lactam. Still another object of this invention is the provision of novel graft copolymers containing a polymeric N-vinyl lactam. Other objects and advantages will appear as the description proceeds.

The attainment of the above objects is made possible by the process of this invention which comprises subjecting a mixture of styrene monomer (including homologues, etc. such as $\alpha$-methylstyrene) in an aqueous solution of a polymeric N-vinyl lactam to polymerization conditions in the presence of a free radical-supplying polymerization catalyst. The process of this invention enables the provision of aqueous emulsions having surprisingly improved properties with respect to stability, low viscosity, film clarity, and the like. Extraction, solubility and film clarity tests indicate that in these emulsions, the polymeric product is in a high degree of interpolymerization or copolymerization and contains a minimum amount of homopolymer. The resulting emulsions can be compounded with a wide variety of additives such as pigments, salts, protective colloids, wetting agents, placticizers, resins, waxes and the like to obtain a wide range of products for use in all fields in which polymeric emulsions are now used such as in the paint, coatings, adhesives, polishes and textile fields.

N-vinyl lactams and water soluble polymers thereof, and methods for their production are well known in the art. Thus, for example U.S. 2,317,804 discloses a suitable method for preparing N-vinyl lactams and U.S. 2,265,450 and 2,335,454 disclose methods for preparing water soluble polymers thereof and aqueous solutions containing the same. As examples of N-vinyl lactams which may be employed in producing in known manner the operative aqueous solutions of water soluble polymers thereof, there may be mentioned the N-vinyl derivatives of gamma-, delta-, and epsilon-lactams (N-vinyl derivatives of the cyclic amides of gamma-, delta-, and epsilon-aminocarboxylic acids of the aliphatic series) and lower alkyl (methyl, ethyl) substituted derivatives of such N-vinyl lactams. Among this group, N-vinyl-2-pyrrolidone (otherwise referred to as 1-vinyl-2-pyrrolidone, N-vinyl-$\alpha$-pyrrolidone) is preferred. As illustrative of other N-vinyl lactams within this group there may be mentioned N-vinyl-2-piperidone, N-vinyl-6-caprolactam, N-vinyl-5-methyl-2-pyrrolidone, N-vinyl-3,3-dimethyl-2-pyrrolidone, and the like. Other N-vinyl lactams which may be employed include N-vinyl-hexahydrophthalimidine, N-vinyl-naphthostyrile, etc. Depending upon the extent of polymerization, these polymeric N-vinyl lactams may have molecular weights ranging from at least 400 up to 2,000,000 or more. The Fickentscher K value is a convenient designation of relative degree of polymerization or relative molecular weight. Generally, there may be employed those polymeric N-vinyl lactams having a K value of about 10 to 200 and preferably about 20 to 60, and mixtures thereof.

The free radical-supplying polymerization catalysts useful in the present process are well known in the art. Most of these catalysts are compounds yielding oxygen under the conditions of polymerization, as represented by the inorganic and organic peroxygen or peroxide compounds. As examples of such compounds, there may be mentioned hydrogen peroxide, metal and alkali metal peroxides such as sodium, potassium, barium and zinc peroxide, diacyl peroxides such as diacetyl, dibenzoyl and dilauroyl peroxide, dialkyl peroxides such as di-(tertiary-butyl) peroxide and di-(tertiary-butyl) hydroperoxide, cyclohexene peroxide, inorganic peroxygen acids such as perboric, persulfuric and peracetic acid and their ammonium, sodium and potassium salts, in addition to redox systems such as potassium or ammonium persulfate-sodium bisulfite. Other oxygen-yielding compounds or sources include atmospheric oxygen, ozone and the like.

Azo type catalysts, i.e. compounds containing the azo linkage, may also be employed. As examples of such catalysts there may be mentioned $\alpha,\alpha'$-azobis-($\alpha,\gamma$-dimethyl-valeronitrile), $\alpha,\alpha'$-azobis-($\alpha$-methyl butyronitrile), $\alpha,\alpha'$-azobis-($\alpha$-ethyl butyronitrile), $\alpha,\alpha'$-azo-diisobutyramide, dimethyl and diethyl $\alpha,\alpha'$-azodiisobutyrate, and the like.

The preferred catalysts effective for the production of optimum results with respect to a minimum of homopolymer and maximum emulsion stability and film clarity are those which are water soluble, preferably the inorganic peroxygen compounds referred to above.

In carrying out the polymerization reaction, the catalyst and styrene monomer may be admixed with the aqueous solution of polymeric N-vinyl lactam in any order, in increments or otherwise. For better temperature control and production of a product with optimum properties, it is, however, preferred to add the monomer gradually and/or in increments to the aqueous solution of polymeric N-vinyl lactam containing the catalyst. The reaction is exothermic in nature and is conveniently carried out at reflux or the boiling point of the mixture. However, the polymerization reaction may be carried out at any temperature ranging from room temperature up to the boiling point, depending upon the particular catalyst employed and the particular monomer and polymeric N-vinyl lactam. It is preferred to carry out this reaction at a temperature ranging from about 70° C. up to the boiling point of the mixture to accelerate completion thereof. The pH of the medium is substantially non-critical, though a pH of about 2 to 7 or 8 is preferred. Completion of the reaction is determined by cessation of evolution of heat and/or spot analysis for solids content and the like.

The polymerization reaction is substantially quantitative in that an emulsion is produced containing the polymeric N-vinyl lactam-styrene copolymer in the dispersed phase with little or no polymeric product dissolved in the continuous aqueous phase. The weight ratio of polymeric N-vinyl lactam to styrene monomer ranges from about 5:95 to 60:40. The catalyst may be employed in amounts of about 0.05 to 2 or 3% by weight based on the weight of the styrene monomer employed in the reaction. Desirably, the polymerization reaction should be carried out in a manner effective for yielding an aqueous emulsion containing about 10 to 60% of the graft copolymer product.

The emulsions produced in accordance with this invention are characterized by unusually good stability, low to medium viscosities generally below about 2500 cps. (centipoises, Brookfield viscosimeter), the ability to deposit a clear transparent film on a glass plate, and a copolymer product which is essentially water insoluble and at least about 90% soluble in benzene. This product may be characterized as a graft copolymer of styrene on a polymeric N-vinyl lactam substrate. In contrast, a copolymerization of an N-vinyl lactam monomer and styrene monomer in about equal amounts yields an unstable emulsion which has a relatively high viscosity of up to 75,000 cps. or more, which yields an opaque film on a glass plate and in which the polymeric product is 50% soluble in benzene, apparently indicating the production of a water soluble N-vinyl lactam homopolymer and a benzene soluble styrene homopolymer.

It will be understood that in carrying out the process of this invention, the known surface active agents, protective colloids, plasticizers, thickeners, and other additives may be added prior to, during or after the polymerization reaction is completed. Anionic, nonionic or cationic emulsifying agents may be employed although anionic and nonionic agents are preferred. As examples of nonionic agents which may be employed, there may be mentioned the condensation products of a plurality of moles of ethylene oxide with organic compounds containing at least 8 carbon atoms and a reactive hydrogen atom such as the water insoluble carboxylic and sulfonic acids, alcohols, thiols, phenols, hydroxy carboxylic acids, carboxy and sulfonic acid amides, primary and secondary amines, hydroxyalkylamines, as disclosed for example in U.S. Patents 1,970,578; 2,205,021; 2,085,706; 2,002,613; 2,266,141; 2,677,700; 2,213,477; 2,593,112; 2,454,434; 2,454,542–545, and 2,174,761. As specific examples of such nonionic agents there may be mentioned the reaction products of 1 mole of nonylphenol with 9–100 E.O. (moles ethylene oxide), 1 mole of castor oil with 20 E.O., 1 mole tall oil with 18 E.O., 1 mole of oleyl alcohol with 20 E.O., 1 mole of dodecyl mercaptan with 9 E.O., 1 mole of soy bean oil amine with 10 E.O., 1 mole of rosin amine with 32 E.O., 1 mole of cocoanut fatty acid amine with 7 E.O., 1 mole of dinonyl phenol with 15 E.O., 1 mole of oxo tridecyl alcohol with 12 E.O., Pluronic L62, and the like.

Suitable anionic surface active agents include the sulfonic acids, sulfate esters, and phosphate esters (particularly the primary and secondary phosphate esters and mixtures thereof) of the above mentioned nonionic surface active agents. Other such anionic surface active agents include alkylaryl sulfonic acids such as dodecylbenzene sulfonic acid, alkyl sulfates such as sodium lauryl sulfate, taurides such as sodium N-methyl tauride, isethionates such as sodium N-methyl isethionate and the like.

Protective colloids and/or thickening agents may also be employed if desired such as polyvinyl alcohol, copolymers such as the copolymer of vinyl methyl ether and maleic anhydride, hydroxyethyl cellulose, carboxymethyl cellulose, natural gums and colloidal materials and the like. Viscosities of up to 20,000 cps. or more may thereby be obtained when required.

As a further feature of this invention, it has been found that the graft copolymers produced herein have sufficiently higher softening points as compared with styrene polymer per se to permit separation by a spray drying technique. The aqueous emulsions produced herein may accordingly be subjected to a spray drying treatment to yield a fine free flowing graft copolymer powder suitable for use in molding compositions, coatings, adhesives, films, fibers and other solid articles, and for redispersion in aqueous media to yield stable emulsions. The following examples are illustrative of this invention and are not to be regarded as limitative. All parts and proportions referred to herein are by weight unless otherwise indicated.

EXAMPLE I

*For comparison*

To a 4-neck, 1-liter flask fitted with stirrer, thermometer, $N_2$ bleed and condenser was charged 350 g. distilled water
15 g. Triton X–200 (sodium isooctyl phenoxyethoxyethylsulfonate)
10 ml. 5% ammonium persulfate
40 g. of a 1:1 mixture of VP (N-vinyl-2-pyrrolidone) and flash distilled styrene.

Following is a log of the reaction:

| Time | Temp., °C. | Comments |
| --- | --- | --- |
| 8:27 | 24.0 | Initial material charged. |
| 9:30 | 24.0 | Heating to reflux under $N_2$ purge and agitation. |
| 9:54 | 100.0 | Refluxing. Adding 200 g. of 1:1 VP/Styrene mixture over 1 hour period. |
| 10:55 | 95.5 | All VP/Styrene in, refluxing to 100° C. |
| 11:17 | 97.5 | Large lumps formed. Shut down, discharged and discarded. |

Appearance: watery liquid, large white hard lumps. Two phases.

When 2 g. $NaHCO_3$ was added at start in order to buffer the system at an alkaline pH, the same results as above were obtained.

EXAMPLE II (*Technique of the present invention*)

To the same equipment as used in the previous experiment was added 350 g. distilled water
120 g. PVP (poly-N-vinyl-2-pyrrolidone), K–30
15 g. Triton X–200
10 ml. 5% ammonium persulfate
24 g. styrene (flashed distilled)

Following is a log of the reaction:

| Time | Temp., °C. | Comments |
| --- | --- | --- |
| 10:00 | 31.0 | All above materials charged. |
| 10:00 | 31.0 | Heating to 80°–85° C. under $N_2$ purge and agitation. |
| 10:40 | 80 | Adding 96 g. styrene continuously over 1 hour. |
| 11:40 | 83 | All styrene in. Refluxing to 95° C. |
| 12:09 | 95.5 | Cool and discharge. |

Analytical results:

Percent solids=39.1
pH=7.45
Brookfield viscosity=950 cps.

Material was a fluid, stable emulsion.

A thin film (0.0015 in.) was spread on a glass plate and allowed to dry overnight at room temperature. The next day it had dried to a clear, transparent film.

This invention has been disclosed with respect to certain preferred embodiments, and various modifications and variations thereof will become obvious to persons skilled in the art. It is to be understood that such modifications and variations are to be included within the spirit and scope of this invention.

We claim:

1. An emulsion polymerization process consisting essentially in subjecting to polymerization conditions, at a temperature ranging from about 70° C. up to the boiling point, an emulsion of styrene in an aqueous solution containing an N-vinyl lactam homopolymer and, as the sole catalyst, about 0.05 to 3%, based on the weight of the styrene, of a water soluble inorganic peroxygen compound, the weight ratio of said homopolymer to said styrene ranging from about 5:95 to 60:40, thereby producing directly a stable aqueous emulsion of a graft copolymer of styrene on an N-vinyl lactam homopolymer substrate.

2. A process as defined in claim 1 wherein the weight ratio of said homopolymer to said styrene is about 50:50.

3. A process as defined in claim 1 wherein said polymeric N-vinyl lactam is polymeric N-vinyl-2-pyrrolidone.

4. A process as defined in claim 1 wherein said catalyst is ammonium persulfate.

5. An emulsion polymerization process consisting essentially in subjecting to polymerization conditions, at a temperature ranging from about 70° C. up to the boiling point, an emulsion of styrene in an aqueous solution containing homopolymeric N-vinyl-2-pyrrolidone and, as the sole catalyst, about 0.05 to 3%, based on the weight of the styrene, of ammonium persulfate, the weight ratio of said homopolymer to said styrene ranging from about 5:95 to 60:40, thereby producing directly a stable aqueous emulsion of a graft copolymer of styrene on homopolymeric N-vinyl-2-pyrrolidone substrate.

References Cited by the Examiner

UNITED STATES PATENTS

| | | | |
|---|---|---|---|
| 2,744,291 | 5/1956 | Stastny et al. | 260—2.5 |
| 2,888,410 | 5/1959 | Buchholtz | 260—885 |
| 2,922,768 | 1/1960 | Mino et al. | 260—881 |
| 3,026,287 | 3/1962 | Murdock et al. | 260—876 |
| 3,026,288 | 3/1962 | Murdock et al. | 260—876 |
| 3,029,218 | 4/1962 | Murdock et al. | 260—885 |

FOREIGN PATENTS

| | | |
|---|---|---|
| 819,049 | 8/1959 | Great Britain. |
| 1,200,760 | 7/1959 | France. |

SAMUEL H. BLECH, *Primary Examiner.*

D. ARNOLD, LEON J. BERCOVITZ, MURRAY TILLMAN, *Examiners.*